United States Patent [19]
Jonokuchi

[11] Patent Number: 6,060,859
[45] Date of Patent: May 9, 2000

[54] MOTOR DRIVER HAVING A BOOSTER CIRCUIT AND AN INVERTER BOTH CONTROLLED BY PULSE WIDTH MODULATION

[75] Inventor: Hideki Jonokuchi, Yokohama, Japan

[73] Assignee: Kabushiki Kaisha Toshiba, Kawasaki, Japan

[21] Appl. No.: 09/163,186

[22] Filed: Sep. 30, 1998

[30] Foreign Application Priority Data

Sep. 30, 1997 [JP] Japan .................................. 9-266141

[51] Int. Cl.$^7$ ...................................................... H02P 7/00
[52] U.S. Cl. .......................................... 318/801; 318/811
[58] Field of Search ................................... 318/139, 254, 318/434, 799–816; 363/51, 54

[56] References Cited

U.S. PATENT DOCUMENTS

| | | | |
|---|---|---|---|
| 5,208,518 | 5/1993 | Grapenthin et al. | 318/138 |
| 5,481,166 | 1/1996 | Moreira | 318/254 |
| 5,589,743 | 12/1996 | King | 318/139 |
| 5,710,699 | 1/1998 | King et al. | 318/139 |
| 5,780,980 | 7/1998 | Naito | 318/139 |

*Primary Examiner*—Jonathan Salata
*Attorney, Agent, or Firm*—Pillsbury Madison & Sutro LLP

[57] ABSTRACT

A motor driver includes an inverter having at least one arm including two series-connected switching elements and converting a direct current to an alternating current to supply the alternating current to an electric motor, a booster circuit connected between the inverter and a DC power supply and including a reactor, a switching element and a reverse-flow preventing diode, the booster circuit supplying the direct current from the DC power supply to the inverter, a current detector for detecting current flowing into the booster circuit, a speed detector for detecting a rotational speed of the motor, and a controller for comparing a speed value detected by the speed detector with a set speed value, thereby determining a command value. The controller controls the inverter on the basis of the command value by pulse width modulation and further controls the booster circuit pulse width modulation so that the booster circuit executes a voltage boosting operation and the current detector so that the detected current value does not exceed an upper limit value.

18 Claims, 8 Drawing Sheets

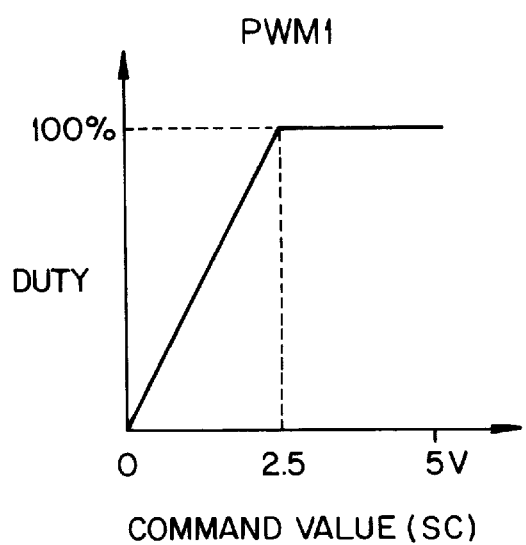 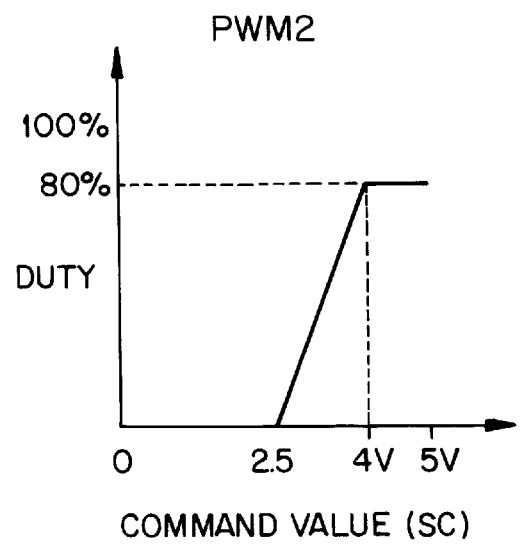
FIG. 4A                    FIG. 4B

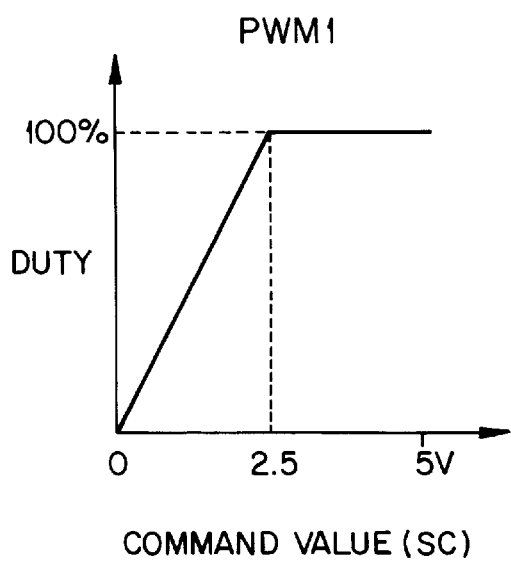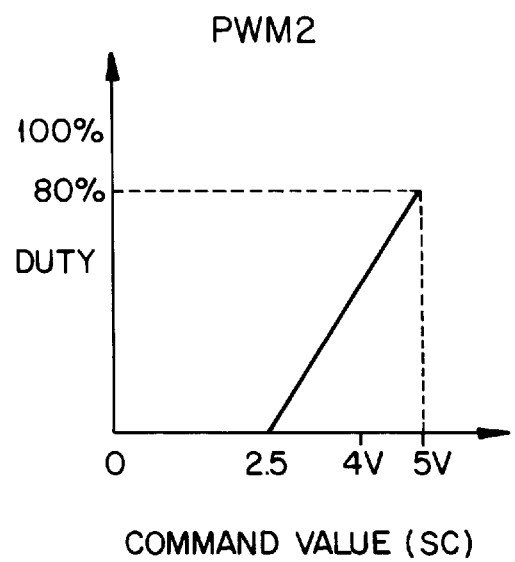
*FIG. 7A*  *FIG. 7B*

MOTOR DRIVER HAVING A BOOSTER CIRCUIT AND AN INVERTER BOTH CONTROLLED BY PULSE WIDTH MODULATION

BACKGROUND OF THE INVENTION

1. Field of the Invention

This invention relates to a motor driver including an inverter driving an electric motor and a booster circuit provided at the DC current side of the inverter.

2. Description of the Prior Art

A motor driver has conventionally been provided for driving an on-vehicle electric motor provided in an automotive vehicle, for example, a brushless motor. In such a motor driver, an inverter converts a direct current from a car battery as a DC power supply to an alternating current, which current is supplied to a stator coil of the brushless motor. In this arrangement, a rotational speed of the motor is detected, and the inverter controls the current by pulse width modulation (PWM) so that the detected motor speed reaches a set speed value. Furthermore, a current flowing into the inverter is detected, and current limitation is executed so that the detected current does not exceed an upper limit value, whereby the device is protected against an overcurrent.

The car battery usually has an operating voltage of 12 V, which value is relatively low. In view of drive of a high output brushless motor, a booster circuit is provided between the car battery and the inverter. In this motor driver, a current flowing into the booster circuit is detected, and the current is limited so that the detected current does not exceed an upper limit value.

In the motor driver having a battery as its DC power supply, there is a possibility of an erroneous connection between positive and negative terminals of the battery, which will be referred to as "reverse connection." As a countermeasure, a diode is connected between the battery and the booster circuit for protecting the device against the reverse connection. In this arrangement, however, current usually flows into the protecting diode in a normal operation. This results in a voltage drop. Particularly when the voltage of the DC power supply such as the battery is low, the voltage drop cannot be ignored and results in a loss depending upon the product of voltage drop and current. To overcome this problem, the prior art has provided a contractor (relay) turned on upon a normal connection of the terminals, instead of the protecting diode.

However, the above-described arrangement requires two current detecting means for detecting the currents flowing into the booster circuit and the inverter for the protection against an overcurrent respectively. This results in complication of the electrical arrangement of the device. Furthermore, the contactor for protection against the reverse connection renders the motor driver large-sized. The contactor also requires a polarity detecting circuit for turning it on and off. The polarity detecting circuit further complicates the electrical arrangement of the motor driver.

SUMMARY OF THE INVENTION

Therefore, an object of the present invention is to provide a motor driver which has a simplified electrical arrangement while the inverter and the booster circuit can be protected against an overcurrent, which can be prevented from being large-sized, and which can be protected against the reverse connection.

The present invention provides a driver for an electric motor comprising an inverter having at least one arm including two series-connected switching elements, the inverter converting a direct current to an alternating current to supply the alternating current to an electric motor. A booster circuit is connected between the inverter and a DC power supply and includes a reactor, a switching element and a reverse-flow preventing diode. The booster circuit supplies the direct current from the DC power supply to the inverter. A current detecting element is provided for detecting current flowing into the booster circuit. A speed detecting element is provided for detecting a rotational speed of the motor. A controller compares a speed value detected by the speed detecting element with a set speed value, thereby determining a command value. The controller controls the inverter on the basis of the command value by pulse width modulation. The controller further controls the booster circuit by pulse width modulation so that the booster circuit carries out a voltage boosting operation and so that the current value does not exceed an upper limit value in the booster circuit.

According to the above-described arrangement, both the inverter and the booster circuit are controlled by pulse width modulation so that the currents flowing into the inverter and the booster circuit respectively do not exceed the upper limit value on the basis of current detection by a single current detecting element. Consequently, the electrical arrangement of the motor driver can be simplified.

In a preferred form, the motor driver further comprises a reverse-connection protecting diode connected in series to the switching element of the booster circuit. The reverse-flow preventing diode of the booster circuit provides the protection of the inverter against reverse connection with respect to the DC power supply. The reverse-connection protecting diode provides the protection of the booster circuit against the reverse connection. Accordingly, a single reverse-connection protecting diode replaces the conventionally provided contactor. Consequently, the size of the motor driver can be rendered smaller.

In another preferred form, the motor driver further comprises a PWM signal generating circuit for generating a PWM signal and the controller distributes the PWM signal generated by the PWM signal generating circuit to the inverter and the booster circuit according to the command value. Furthermore, the controller preferably sets a maximum command value so that a maximum duty of the PWM signal supplied to the booster circuit does not exceed a duty required at a maximum output. Additionally, the motor driver preferably further comprises a circuit board constituting the booster circuit and the inverter, and wherein the reactor of the booster circuit is mounted integrally on the circuit board.

In further another preferred form, two booster circuits are connected in parallel with each other and the reverse-flow preventing diodes of the booster circuits are enclosed in a package having two independent anodes and a common cathode. In this arrangement, furthermore, the booster circuits are preferably provided with reverse-connection protecting diodes respectively and the diodes are enclosed in a package having two independent anodes and a common cathode.

BRIEF DESCRIPTION OF THE DRAWINGS

Other objects, features and advantages of the present invention will become clear upon reviewing the following description of the preferred embodiments, made with reference to the accompanying drawings, in which:

FIGS. 4A and 4B are graphs showing the relations between the command values and the duty of the PWM signals 1 and 2 respectively;

FIGS. 7A and 7B are graphs similar to FIGS. 4A and 4B respectively, showing a second embodiment in accordance with the invention;

DETAILED DESCRIPTION OF THE PREFERRED EMBODIMENTS

Figure 1:
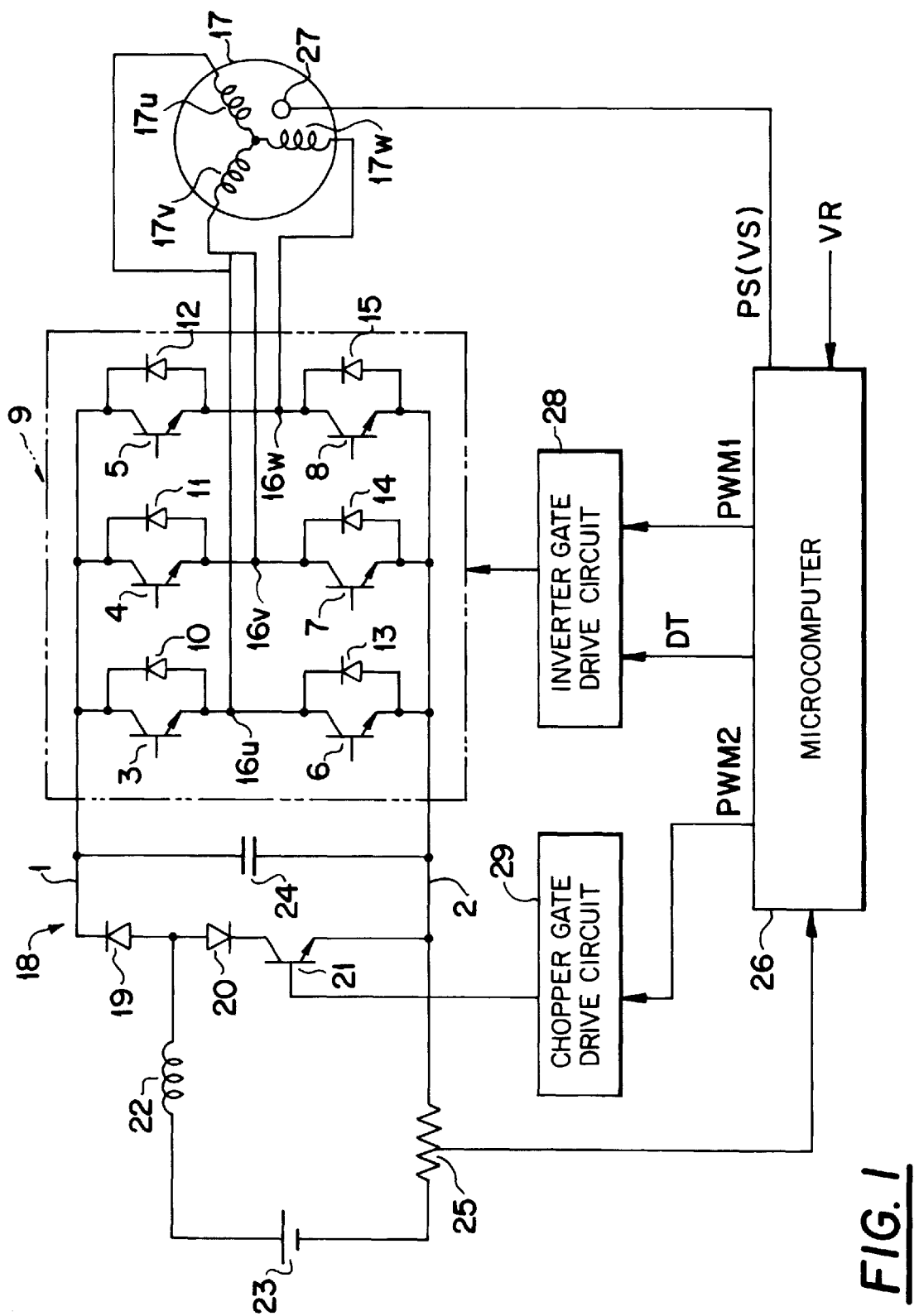
FIG. 1 illustrates an electrical arrangement of the motor driver of a first embodiment in accordance with the present invention.

A first embodiment of the present invention will be described with reference to FIGS. 1 to 6. The invention is applied to a driver for a brushless motor driving a power steering provided in automotive vehicles. Referring to FIG. 1, an electrical arrangement of the driver is shown. An inverter 9 is connected between a positive side DC bus bar 1 and a negative side DC bus bar 2. The inverter 9 comprises, for example, six bridge-connected NPN transistors 3 to 8 serving as switching elements. Free-wheel diodes 10 to 15 are connected between the collectors and the emitters of the transistors 3 to 8 respectively. A series circuit of the transistors 3 and 6, a series circuit of the transistors 4 and 7, and a series circuit of the transistors 5 and 8 constitute three or three-phase arms respectively. Output terminals 16u, 16v and 16w of the inverter 9 are connected to star-connected stator coils 17u, 17v and 17w of a brushless motor 17 which has an output of 600 W, for example. The brushless motor 17 comprises a permanent-magnet type rotor.

Between the bus bars 1 and 2 are further connected a reverse-flow preventing diode 19, a reverse-connection protecting diode 20 and a series circuit between the collector and emitter of an NPN transistor 21 serving as a switching element. The diode 20 has an anode connected via a reactor 22 to a negative terminal of a battery 23 (12 V) serving as a DC power supply. In this arrangement, the reactor 22, the transistor 21 and the reverse-flow preventing diode 19 constitute a chopper circuit or chopper converter 18 serving as a booster circuit in the invention. The reverse-connection protecting diode 20 is connected in series to the transistor 21. A smoothing capacitor 24 is further connected between the bus bars 1 and 2. The negative side DC bus bar 2 is connected via a shunt resistor 25 serving as current detecting element to the negative terminal of the battery 23.

A microcomputer 26 serves as a controller in the invention. A position sensor 27 comprising, for example, a Hall IC is provided for detecting a rotational position of the rotor of the brushless motor 7, thereby delivering a position signal PS representative of the position of the rotor. The position signal PS is supplied to the microcomputer 51 speed setter (not shown) also delivers a set speed value VR to the microcomputer 26. Based on the position signal PS, the microcomputer 26 obtains by operation energization timing signals DT for the transistors 3 to 8 of the inverter 9. The microcomputer 26 further detects a rotational speed of the motor 17 from the position signal PS, thereby obtaining a detected speed value VS. Thus, the position signal PS delivered from the position sensor 27 serves not only as the signal representative of the position of the rotor but also as a rotational speed signal (detected speed value VS). Accordingly, the position sensor 27 serves to detect the rotational speed of the motor 17 as well as to detect the rotational position of the rotor.

The microcomputer 26 compares the set speed value VR and the detected speed value VS, thereby delivering a command value SC according to a deviation therebetween. In this case, the command value SC becomes larger as the deviation (an absolute value of the difference between the values VR and VS) is increased, and the command value SC becomes smaller as the deviation is reduced. For example, the microcomputer 26 multiplies the deviation by a suitable value to thereby deliver a voltage value ranging between 0 and 5 V. This voltage value serves as the command value SC. Although the command value SC thus ranges between 0 and 5 V, 4 V is set as a maximum value when the command value SC becomes equal to or larger than 4 V, as will be described later.

Figure 2:
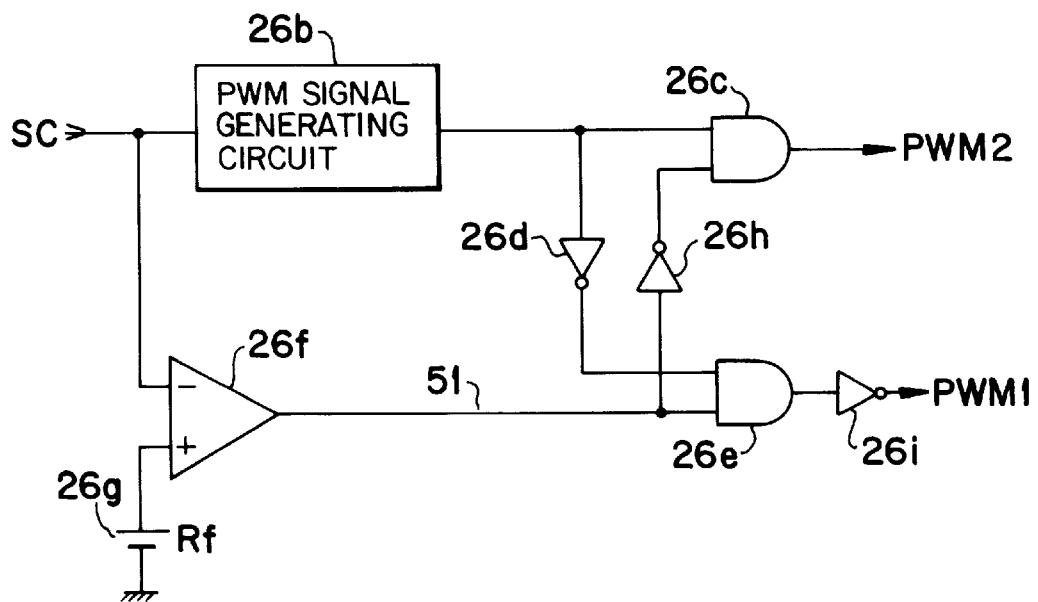
FIG. 2 is a block diagram of part of the arrangement of the microcomputer.

Referring now to FIG. 2, the arrangement of a PWM signal distribution circuit 51 constituting a part of the microcomputer 26 is schematically shown. The PWM signal distribution circuit 51 comprises the PWM signal generating circuit 26b, AND circuits 26c and 26e, NOT circuits 26d, 26h and 26i, a comparator 26f, and a reference voltage generator (a cell) 26g. The command value SC is supplied to an input terminal of the PWM signal generating circuit 26b. The PWM signal generating circuit 26b compares the command value SC with a triangular carrier wave, thereby delivering a PWM signal from its output terminal. The PWM signal is supplied to one of input terminals of the AND circuit 26c and via the NOT circuit 26d to one of input terminals of the AND circuit 26e.

The command value SC is supplied to an inverting input terminal of the comparator 26f. The reference voltage generator 26g delivers a reference voltage Rf (2.5 V, for example) to a non-inverting input terminal of the comparator 26f. A signal delivered from an output terminal of the comparator 26f is supplied both to the other input terminal of the AND circuit 26e and to the other input terminal of the AND circuit 26c via the NOT circuit 26h. The AND circuit 26c delivers a chopper circuit PWM signal PWM2 from the output terminal thereof. Furthermore, the AND circuit 26e delivers an inverter PWM signal PWM1 via the NOT circuit 26i from the output terminal thereof.

Returning to FIG. 1, the microcomputer 26 delivers an energization timing signal DT and the inverter PWM signal PWM1 to respective input terminals of an inverter gate drive circuit 28. The microcomputer 26 further delivers the chopper PWM signal PWM2 to an input terminal of a chopper gate drive circuit 29. The inverter gate drive circuit 28 synthesizes the energization timing signal DT and the PWM signal PWM1 to thereby deliver a base signal (gate signal) from an output terminal thereof to the bases of the transistors 3 to 8. Furthermore, the chopper gate drive circuit 29 delivers the PWM signal PWM2 as a base signal (gate signal) from an output terminal thereof to the base of the transistor 21. The shunt resistor 25 delivers the detected current value IS to the comparator 26. The microcomputer 26 compares the detected current value IS with an upper limit current value, thereby executing a control by pulse width modulation as will be described later.

Figure 3A:
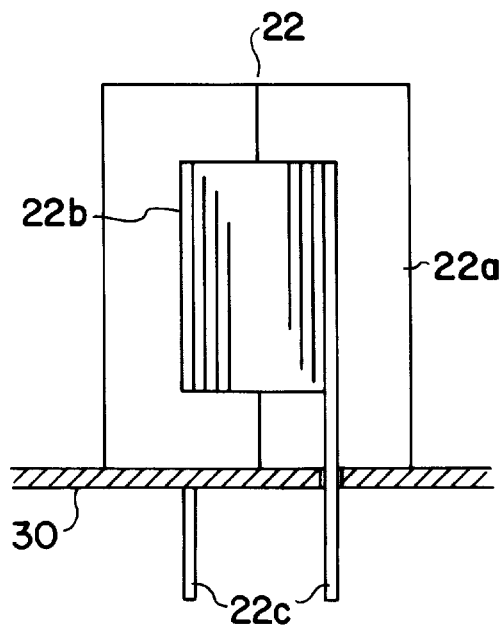
FIGS. 3A and 3B illustrate a reactor mounted integrally on the circuit board.
Figure 3B:
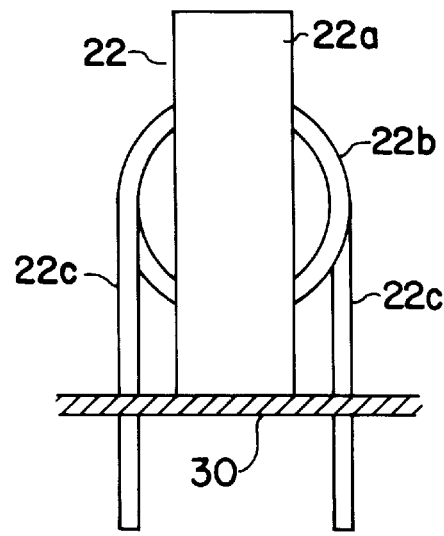

The reactor 22 of the chopper circuit 18 comprises a two-piece core 22a and a coil 22b wound on the core 22a as shown in FIG. 3. Two downwardly projecting terminals 22c are connected to both ends of the coil 22b respectively. The reactor 22 is mounted on a circuit board 30 on which the inverter 9, the chopper circuit 18, the microcomputer 26 and the gate driver circuits 28 and 29 are also mounted or composed. The terminals 22c of the reactor 22 are inserted through insertion holes formed through the circuit board 30 and then soldered to a conductor pattern. As a result, the reactor 22 is integrated with the circuit board 30.

The operation of the motor driver will now be described. The microcomputer 26 compares the detected speed value VS and the set speed value VR both obtained from the position signal PS delivered from the position sensor 27, determining the command value SC on the basis of the deviation between the values VS and VR. The determined command value SC is supplied to the PWM signal generating circuit 26b. The PWM signal generating circuit 26b generates a PWM signal so that the detected speed value VS becomes equal to the set speed value VR. The command value SC is also supplied to the inverting input terminal of the comparator 26f. The comparator 26f delivers a high-level output signal until the command value SC reaches the reference voltage Rf (2.5 V).

When having been turned to the high level, the output signal of the comparator 26f is supplied to the AND circuit 26e, and a low-level signal inverted by the NOT circuit 26h is supplied to the AND circuit 26c. Accordingly, the PWM signal delivered from the PWM signal generating circuit 26b does not pass through the AND circuit 26c, and an inverted PWM signal obtained by inverting the PWM signal by the NOT circuit 26d passes through the AND circuit 26e, instead. The inverted PWM signal delivered from the AND circuit 26e is re-inverted by the NOT circuit 27i into the inverter PWM signal PWM1, which signal is supplied to the inverter gate drive circuit 28.

The energization timing signal DT generated on the basis of the position signal PS is also supplied to the inverter gate drive circuit 28. Accordingly, the inverter gate drive circuit 28 supplies the PWM signal PWM1 to the base of one or more of the transistors 3 to 8 corresponding to the energization timing signal DT. Consequently, the motor 17 is controlled so that its rotational speed becomes equal to the set speed value VR. In this case, when the command value SC varies from 0 V up to 2.5 V, the duty of the PWM signal delivered from the PWM signal generating circuit 26b changes up to 100% in proportion to the command value SC, as shown in FIG. 4A. The duty of the PWM signal becomes 100% when the command value SC has reached 2.5 V. More specifically, the output signal of the comparator 26f is turned to the low level when the command value SC exceeds 2.5 V. Accordingly, the output signal of the AND circuit 26e is turned to the low level, whereupon the output signal of the NOT circuit 26i is turned to the high level. As a result, the duty of the inverter PWM signal PWM1 is maintained at 100%.

When the command value SC varies from 2.5 V up to 5 V, the duty of the PWM signal delivered from the PWM signal generating circuit 26b changes from 0% up to 100%, as shown in FIG. 4B. A high level signal is supplied via the NOT circuit 26h to the AND circuit 26c when the output signal of the comparator 26f is turned to the low level. Then, the AND circuit 26c permits the PWM signal delivered from the PWM signal generating circuit 26b to pass therethrough, delivering the PWM signal as the chopper PWM signal PWM2 to the chopper gate drive circuit 29. The chopper gate drive circuit 29 supplies the base signal according to the signal PWM2 to the base of the transistor 21 of the chopper circuit 18. Consequently, the transistor 21 is turned on and off according to the duty of the signal PWM2.

When the transistor 21 is turned on in the chopper circuit 18, current flows from the battery 23 to the reactor 22 through the reactor, the diode 20 and the transistor 21. When the transistor 21 is turned off, electric energy stored in the reactor 22 is discharged through the diode 19, so that a chopped voltage is applied to the capacitor 24. In this case, a chopping ratio of voltage depends upon the duty of the signal PWM2. The chopping ratio is rendered larger as the duty of the signal PWM2 is increased.

When the command value SC based on the deviation of the detected and set speed values VS and VR increases to or above 4 V, the microcomputer 26 fixes the command value SC to 4 V, as shown in FIG. 4B. In other words, a maximum value of the command value SC is limited to 4 V. When the command value SC is at 4 V, the duty of the PWM signal delivered from the PWM signal generating circuit 26b or the chopper PWM signal PWM2 is set, for example, at 80%.

Figure 5:
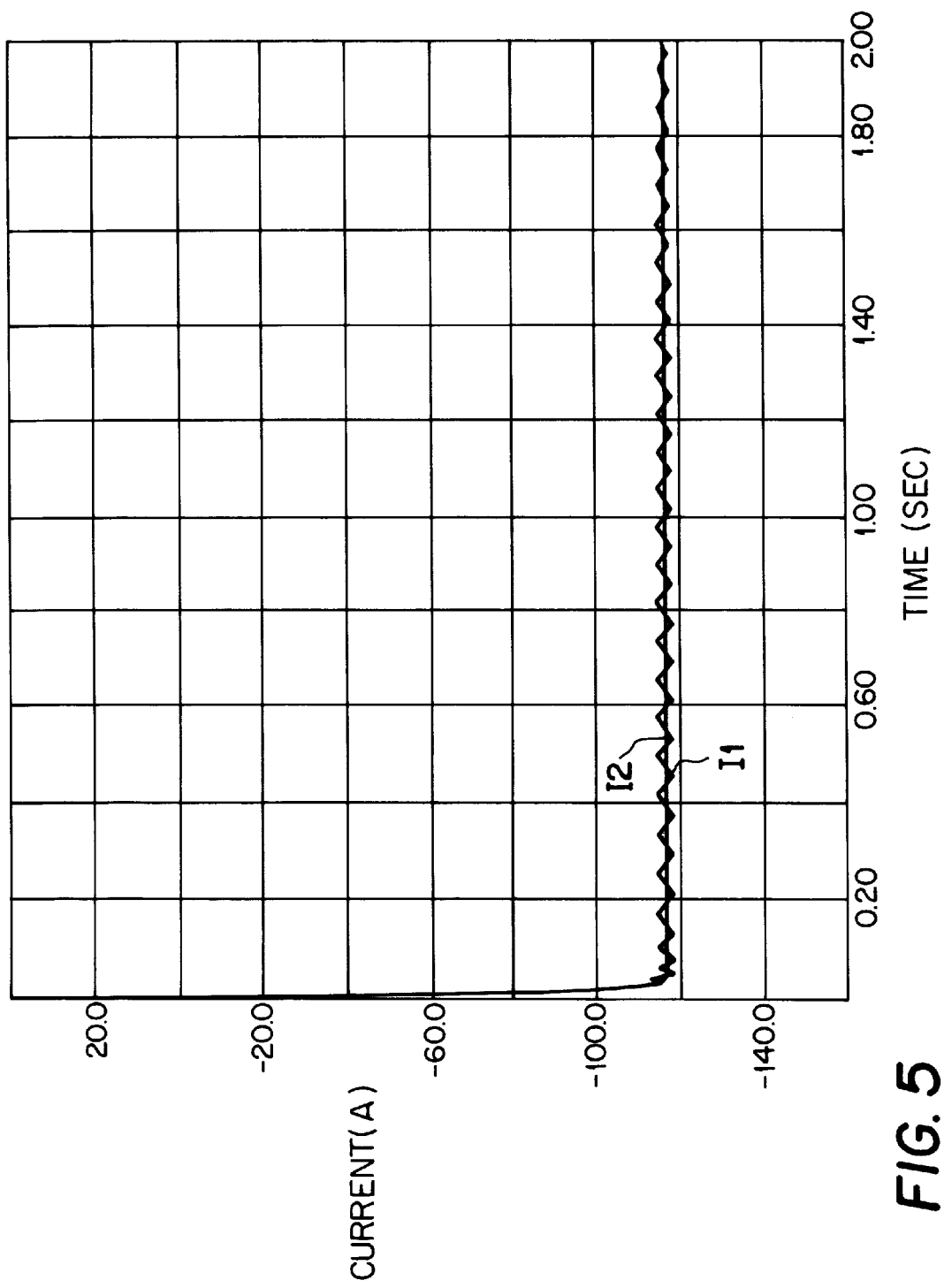
FIG. 5 is a graph showing a current waveform.
Figure 6:
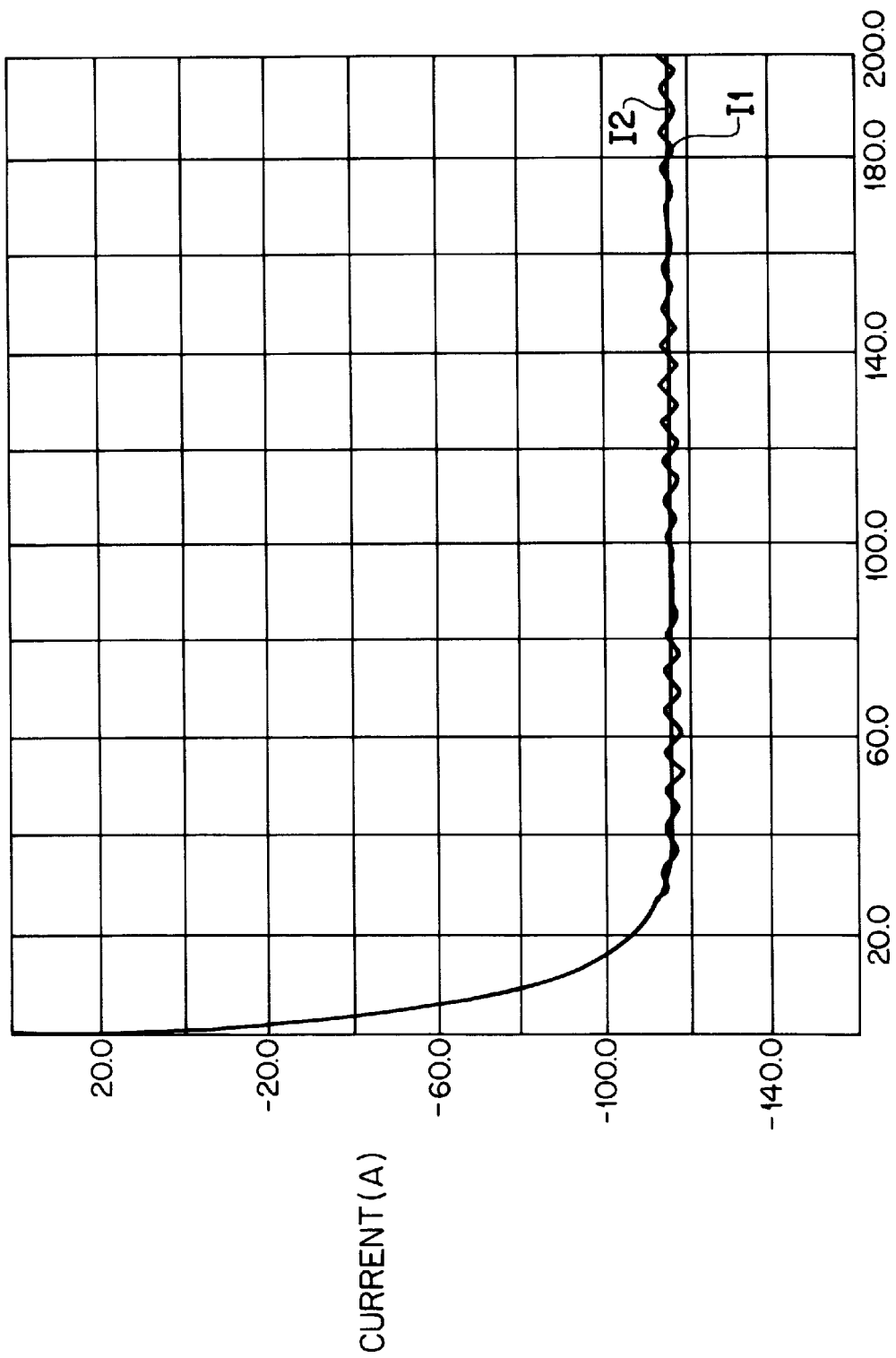
FIG. 6 is a partially enlarged graph of FIG. 5.
Figure 8:
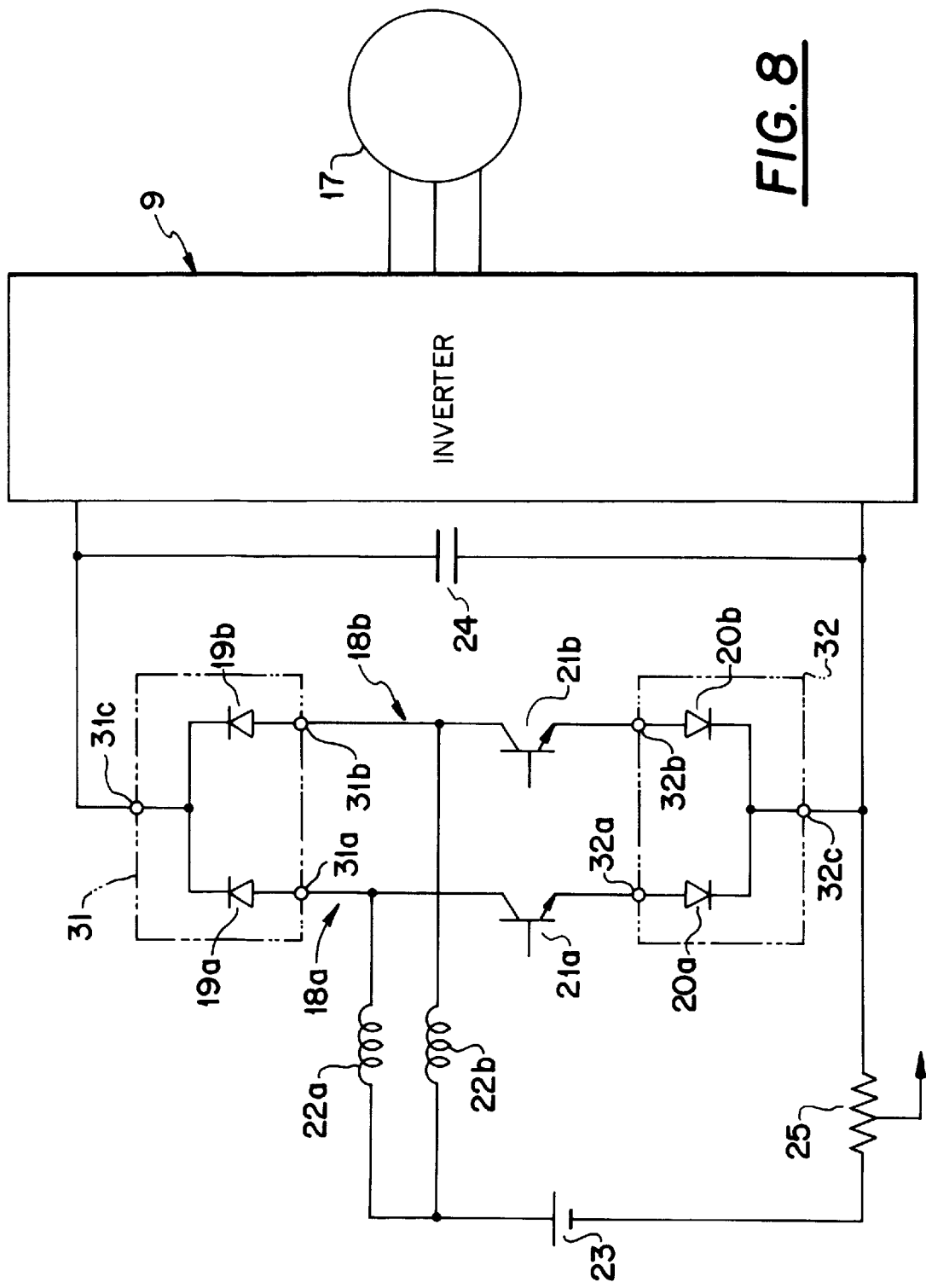
FIG. 8 illustrates the electrical arrangement of the motor driver of a third embodiment in accordance with the invention.

FIGS. 5 and 6 show waveforms obtained by measuring a current I1 flowing into the chopper circuit 18 and a current I2 flowing into the inverter 9 respectively. FIG. 6 is a graph of FIG. 5 partially enlarged by ten times. The current polarity in FIG. 5 is inverted relative to that in FIG. 6. In the embodiment, the reactor 22 has an inductance of 20 $\mu$H, and the capacitor 24 has a capacitance of 4700 $\mu$F. Each of the stator coils 17u, 17v and 17w has an inductance of 0.8 mH and a resistance of 150 m$\Omega$.

FIGS. 5 and 6 show an example of most sudden step response and that the current I1 and current I2 are approximately equal to each other. Accordingly, the current I2 flowing into the inverter 9 can indirectly be detected by detection of the current I1 flowing into the chopper circuit 18. This current detecting arrangement constitutes a first current detecting element detecting the current I1 flowing into the chopper circuit 18 and a second current detecting element detecting the current I2 flowing into the inverter 9. In order that the current I2 may be detected as the current I1 or the currents I1 and I2 may be approximately equal to each other, the experiments show that the inductance of each stator coil needs to be set to be ten times as large as that of the reactor 22 or more. According to the experiments, an error between the currents I1 and I2 is about 5% when the inductance of each stator coil or inductance per phase is ten times as large as that of the reactor 22 or more. Thus, the current I2 can be detected with a sufficient accuracy by detecting only the current I1. In the embodiment, the inductance of each of the stator coils 17u, 17v and 17w is about 40 times as large as that of the reactor 22. On the other hand, the error between the currents I1 and I2 becomes larger when the inductance of each stator coil is ten times as large as that of the reactor 22 or less.

The settability of the inductances of the stator coils and the reactor in the above-described relation will be described. In a high-voltage motor with the chopper circuit, the winding inductance and the winding resistance can generally be set at large values. For example, in a motor having an output of 600 W at 12 V, the winding inductance can be set at or about 250 $\mu$H. Furthermore, in a case where a capacitor is used in the chopper circuit used in a drive circuit for the motor having the output of 600 W at 12 V, the capacitance thereof can be set in a range between 2000 and 10000 $\mu$F when a chopping frequency is set at about 20 kHz. The inductance of the reactor 22 of the chopper circuit used in the drive circuit for this motor can be set at or below 5 $\mu$H. According to the above-described setting conditions, the winding inductance per phase can be set to be ten times as large as that of the reactor of the chopper circuit or more in the motor having the output of 600 W at 12 V.

The microcomputer 26 reads the detected current value IS (current I1) from the shunt circuit 25 and compares the read current value IS with a predetermined upper limit value. When the current value IS is above the upper limit value, the microcomputer 26 controls the PWM signal delivered from the PWM signal generating circuit 26b so that the detected current value IS becomes equal to the upper limit value. Consequently, the current I1 flowing into the chopper circuit 18 can be prevented from being an overcurrent, and the current I2 flowing into the inverter 9 can also be prevented from becoming an overcurrent. Thus, an overcurrent can be prevented from flowing into the stator coils 17u, 17v and 17w of the motor 17.

According to the above-described embodiment, the current I1 flowing into the chopper circuit 18 is detected by the shunt resistor 25. This detecting operation also detects the current I2 flowing into the inverter 9. Thus, both the chopper circuit 18 and the inverter 9 are protected against the overcurrent by a single shunt resistor 25. Consequently, the circuit arrangement of the motor driver can be simplified as compared with the prior art, and the size of the motor driver can be prevented from being rendered large.

The reverse connection protecting diode 20 is connected in series to the transistor 21 of the chopper circuit 18 in the foregoing embodiment. Accordingly, the reverse-flow preventing diode 19 for the chopper circuit 18 protects the inverter 9 against the reverse connection with respect to the battery 23, and the reverse connection protecting diode 20 protects the chopper circuit 18 against the reverse connection. No contactor required in the prior art is necessary and only a single reverse connection protecting diode 20 is required. Consequently, the motor driver can further be rendered small-sized. Furthermore, the chopper circuit 18 is not operated so frequently when the brushless motor 17 is driven. This reduces the loss in the reverse connection protecting diode 20 due to voltage drop. More specifically, the motor 17 is operated at full power or at a power approximate to the full power when the chopper circuit 18 is operated. The chopper circuit 18 remains almost nonoperative during a normal operation of the motor 17.

The microcomputer 26 distributes the PWM signal from the PWM signal generating circuit 26b both to the inverter 9 and to the chopper circuit 18 according to the command value SC. More specifically, when the command value SC is smaller than the reference voltage Vf (2.5 V), the microcomputer 26 fixes the PWM duty of the chopper circuit 18 to 0% and delivers the PWM signal as the inverter PWM signal PWM1. When the command value SC is equal to or larger than the reference voltage Vf, the microcomputer 26 fixes the PWM duty of the inverter 9 to 100% and delivers the PWM signal as the chopper PWM signal PWM2. The PWM signal generating circuit 26b thus serves both for the inverter 9 and for the chopper circuit 18. Consequently, the electrical arrangement of the motor driver can further be simplified.

The maximum command value SC is set at 4 V so that the maximum duty of the chopper PWM signal PWM2 does not exceed the duty of 80% required at the maximum output. Consequently, the chopping ratio of the chopping circuit 18 is prevented from being increased more than required and accordingly, the safety of the motor driver can be improved. The reason for the setting of the maximum duty of the signal PWM2 at 80% is as follows. If the maximum duty of the signal PWM2 should be set at a value exceeding 80% and approximated to 100%, the transistor 21 would not sometimes be turned off in the off period of the PWM signal PWM2 due to variations in the characteristics of the transistors 21. Upon occurrence of such a situation, the battery 23 would be short-circuited via the reactor 22. In view of this drawback, the maximum duty of the chopper circuit PWM signal PWM2 is set at 80%.

The reactor 22 of the chopper circuit 18 is integrated with the circuit board 30 on which the inverter 9, the chopper circuit 18, the microcomputer 26 and the gate drive circuits 28 and 29 are also composed. Consequently, the motor driver can further be rendered small-sized as compared with the case where the reactor 22 is composed on a component or part other than the circuit board 30.

The current detecting element or shunt resistor 25 is provided for detecting the current I1 flowing into the chopper circuit 18, and no means for directly detecting the current I2 flowing into the inverter 9 is provided in the foregoing embodiment. However, first and second current detecting means may be provided for directly detecting the currents I1 and I2 respectively, instead. Although the two current detecting elements slightly complicate the arrangement of the motor driver, the loss in the reverse connection protecting diode 20 due to the voltage drop can be reduced as in the foregoing embodiment.

FIGS. 7A and 7B illustrate a second embodiment of the invention and are similar to FIGS. 4A and 4B in the foregoing embodiment respectively. In the second embodiment, the operation of the PWM signal generating circuit 26b differs from that in the first embodiment. As shown in FIG. 7A, the duty of the PWM signal PWM2 is changed from 0% to 80% in proportion to the command value SC as the latter varies from 2.5 V to 5 V. The duty becomes 80% when the command value SC is increased to 5 V. That is, the maximum value of the command value SC is 5 V, and the duty of the chopper circuit PWM signal PWM2 is 80% when the command value SC is 5 V. This arrangement also achieves the same effect as in the first embodiment. The other arrangement in the second embodiment is the same as in the first embodiment.

FIGS. 8 to 11 illustrate a third embodiment of the invention. The differences between the first and third embodiments will be described and the identical or similar parts are labeled by the same reference symbols as those in the first embodiment. A single chopper circuit 18 is provided between the battery 23 and the inverter 9 in the first embodiment. In the second embodiment, however, two electrically independent chopper circuits 18a and 18b are connected in parallel with each other between the battery 23 and the inverter 9. In the chopper circuits 18a and 18b, the diodes 20a and 20b for the protection against the reverse connection are connected to the emitter sides of the transistors 21a and 21b respectively.

The reverse-flow preventing diodes 19a and 19b are enclosed in a package 31 having three terminals, namely, two independent anodes 31a and 31b and a common cathode 31c. Furthermore, the reverse connection protecting diodes 20a and 20b are also enclosed in a package 32 having three terminals, namely, two independent anodes 32a and 32b and a common cathode 32c.

Figure 9A:
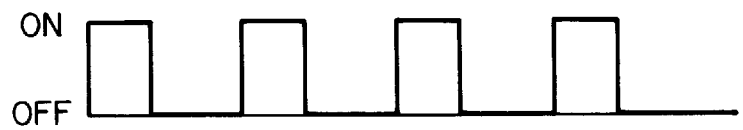
FIGS. 9A and 9B show on and off states of the transistors of the chopper circuits at the middle output levels respectively.
Figure 9B:
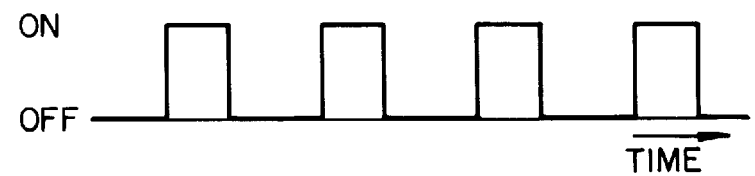
Figure 10A:
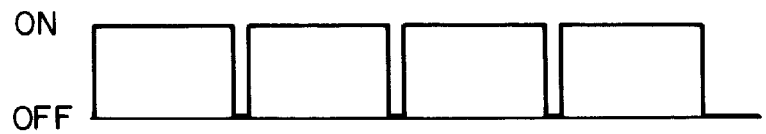
FIGS. 10A and 10B show on and off states of the transistors of the chopper circuits at the high output levels respectively.
Figure 10B:
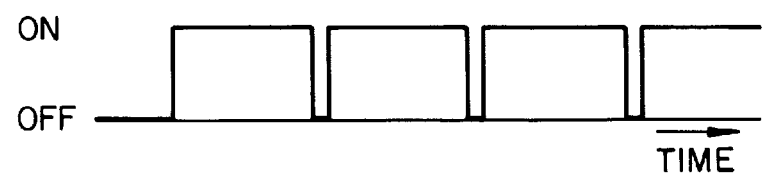
Figure 11A:
FIGS. 11A and 11B show on and off states of the transistors of the chopper circuits at the low output levels respectively.
Figure 11B:
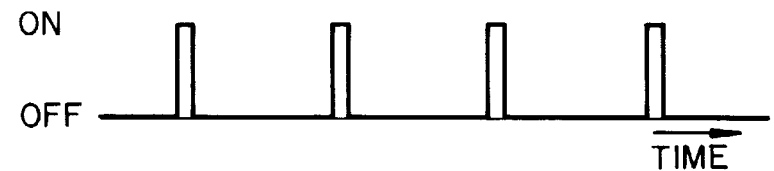

The operation of the motor driver of the third embodiment will be described. The transistors 21a and 21b of the respective chopper circuits 18a and 18b are turned on and off on the basis of the chopper circuit PWM signals in the same manner as in the first embodiment. As shown in FIGS. 9A to 11B, however, on-off frequencies or chopping frequencies of the chopper circuits are set so as to have a phase difference of 180 degrees. FIGS. 9A and 9B show on and off states of the transistors 21a and 21b of the two chopper circuits 18a and 18b at the middle output levels respectively. FIGS. 10A and 10B show on and off states of the transistors 21a and 21b of the chopper circuits 18a and 18b at the high output levels respectively. FIGS. 11A and 11B show on and off states of the transistors 21a and 21b of the chopper circuits 18a and 18b at the low output levels respectively. The on times in FIGS. 10A and 10B are longer than the on times in FIGS. 9A and 9B and shorter than the on times in FIGS. 11A and 11B.

According to the third embodiment, the electrically independent two chopper circuits 18a and 18b are connected in parallel with each other between the battery 23 and the inverter 9. The transistors 21a and 21b of the chopper circuits 18a and 18b have the on and off frequencies (chopping frequencies) with a phase difference of 180 degrees from each other. In this arrangement, a charging frequency of the capacitor 24 is doubled as compared with that in the first embodiment. Consequently, a current ripple due to on pulses can be rendered smaller. On the other hand, the capacitance of the smoothing capacitor 24 can be one half when the previous current ripple is permitted.

The reverse-flow preventing diodes 19a and 19b are used as enclosed in the package 31 having the two independent anodes 31a and 31b and the one common cathode 31c. Furthermore, the reverse connection protecting diodes 20a and 20b are also used as enclosed in the package 32 having the two independent anodes 32a and 32b and the one common cathode 32c. This reduces the cost of the parts. Furthermore, the two reverse-flow preventing diodes 19a and 19b can be treated as a single component and the two reverse connection protecting diodes 20a and 20b can be treated as a single component. Consequently, the electrical arrangement of the motor driver can further be simplified and the size of the motor driver can further be reduced.

Although the position sensor 27 is provided as the speed detecting element in the foregoing embodiments, a pulse encoder may be provided therefor, instead. The inverter 9, the chopper circuit 18 or chopper circuits 18a and 18b, the microcomputer 26, and the gate drive circuits 28 and 29 are composed on the circuit board 30 in the foregoing embodiments. However, only the microcomputer 26 may be composed on another circuit board, instead. Although the NPN transistors 3 to 8 are used as the switching elements in the foregoing embodiments, FETs or IGBTs may be used therefor, instead. Although the two chopper circuits 18a and 18b are parallel connected in the third embodiment, three or more chopper circuits may be provided in parallel connection, instead. The motor 17 should not be limited to the brushless motor. It may be an induction motor or a switched reluctance motor. The three-phase inverter 9 is used as an inverter in the foregoing embodiments. However, an inverter may be selected according to the number of phases of the motor. The inverter should have one or more arms each including two series-connected switching elements and convert the DC current to the AC current, which is supplied to the motor.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A driver for an electric motor comprising:

an inverter having at least one arm including two switching elements connected in series, the inverter converting a direct current to an alternating current to supply the alternating current to the motor;

a booster circuit connected between the inverter and a DC power supply and including a reactor, a switching element and a diode to prevent a reverse current, the booster circuit supplying the direct current from the DC power supply to the inverter;

a current detecting element which detects current flowing into the booster circuit;

a speed detecting element which detects a rotational speed of the motor; and a controller comparing a speed value detected by the speed detecting element with a set speed value to determine a command value, the controller controlling the inverter on the basis of the command value by pulse width modulation and further controlling the booster circuit by pulse width modulation, wherein the booster circuit carries out a voltage boosting operating to prevent the current value from exceeding an upper limit value in the booster circuit.

2. The motor driver according to claim 1, further comprising a diode connected in series to the switching element of the booster circuit to protect the booster circuit against a reverse-connection.

3. The motor driver according to claim 1, which further comprises a PWM signal generating circuit for generating a PWM signal and wherein the controller distributes the PWM signal generated by the PWM signal generating circuit to the inverter and the booster circuit according to the command value.

4. The motor driver according to claim 3, wherein the controller supplies the PWM signal both to the inverter when the command value is smaller than a reference value and to the booster circuit when the command value is equal to or larger than the reference value, and the controller supplies both to the booster circuit the PWM signal having a duty fixed at 0% when the command value is smaller than the reference value and to the inverter the PWM signal having a duty fixed at 100% when the command value is equal to or larger than the reference value.

5. The motor driver according to claim 1, wherein the controller sets a maximum command value to prevent a maximum duty of the PWM signal supplied to the booster circuit from exceeding a duty required at a maximum output.

6. The motor driver according to claim 5, wherein the controller sets the maximum duty of the PWM signal supplied to the booster circuit at 80%.

7. The motor driver according to claim 1, which further comprises a circuit board on which the booster circuit and the inverter are mounted, and wherein the reactor of the booster circuit is mounted integrally on the circuit board.

8. The motor driver according to claim 1, wherein two booster circuits are connected in parallel with each other and have on and off frequencies set to have a phase difference of 180 degrees.

9. The motor driver according to claim 1, wherein two booster circuits are connected in parallel with each other and the reverse-flow preventing diodes of the booster circuits are enclosed in a package having two independent anodes and a common cathode.

10. The motor driver according to claim 9, wherein the booster circuits are provided with respective reverse-connection protecting diodes enclosed in a package having two independent anodes and a common cathode.

11. A driver for an electric motor comprising:

an inverter having at least one arm including two switching elements connected in series, the inverter converting a direct current to an alternating current to supply the alternating current to the motor;

a booster circuit connected between the inverter and a DC power supply and including a reactor, a switching element and a diode to prevent a reverse current, the booster circuit supplying the direct current from the DC power supply to the inverter;

a first current detecting element which detects current flowing into the booster circuit;

a second current detecting element which detects current flowing into the inverter;

a speed detecting element which detects a rotational speed of the motor; and a controller comparing a speed value detected by the speed detecting element with a set speed value to determine a command value, the controller controlling the inverter on the basis of the command value by pulse width modulation and further controlling the booster circuit by pulse width modulation, wherein the booster circuit carries out a voltage boosting operation to prevent the detected current values from exceeding upper limit values respectively in the booster circuit; and a diode connected in series to the switching element of the booster circuit to protect circuit against a reverse-connection.

12. The motor driver according to claim 11, which further comprises a PWM signal generating circuit for generating a PWM signal and wherein the controller distributes the PWM signal generated by the PWM signal generating circuit to the inverter and the booster circuit according to the command value.

13. The motor driver according to claim 12, wherein the controller supplies the PWM signal both to the inverter when the command value is smaller than a reference value and to the booster circuit when the command value is equal to or larger than the reference value, and the controller supplied both to the booster circuit and PWM signal having a duty fixed at 0% when the command value is smaller than the reference value and to the inverter the PWM signal having a duty fixed at 100% when the command value is equal to or larger than the reference value.

14. The motor driver according to claim 11, wherein the controller sets a maximum command value so that a maximum duty of the PWM signal supplied to the booster circuit does not exceed a duty required at a maximum output.

15. The motor driver according to claim 11, which further comprises a circuit board on which the booster circuit and the inverter are mounted, and wherein the reactor of the booster circuit is mounted integrally on the circuit board.

16. The motor driver according to claim 11, wherein two booster circuits are connected in parallel with each other and the booster circuits have on and off frequencies set to have a phase difference of 180 degrees.

17. The motor driver according to claim 11, wherein two booster circuits are connected in parallel with each other and the reverse-flow preventing diodes of the booster circuits are enclosed in a package having two independent anodes and a common cathode.

18. The motor driver according to claim 17, wherein the booster circuits are provided with respective reverse-connection protecting diodes enclosed in a package having two independent anodes and a common cathode.

* * * * *